United States Patent [19]

Young et al.

[11] E Re. 29,506

[45] Reissued Jan. 3, 1978

[54] METHOD OF SEALING THE END OF A FILLED WELDING ROD

[75] Inventors: Richard W. Young, LaHabra; Sidney A. Siebert, Fullerton, both of Calif.

[73] Assignee: Cabot Corporation, Kokomo, Ind.

[21] Appl. No.: 637,567

[22] Filed: Dec. 4, 1975

Related U.S. Patent Documents

Reissue of:

[64] Patent No.: 3,894,211
Issued: July 8, 1975
Appl. No.: 468,806
Filed: May 10, 1974

[51] Int. Cl.[2] ..... B22D 11/126

[52] U.S. Cl. ..... 29/527.4; 219/145.22

[58] Field of Search ..... 219/145, 146; 29/527.4

[56] References Cited

U.S. PATENT DOCUMENTS

| | | | |
|---|---|---|---|
| 1,825,829 | 10/1931 | Stoody et al. | 219/145 |
| 2,452,493 | 10/1948 | Rollason et al. | 427/59 X |
| 2,785,285 | 3/1957 | Bernard | 219/146 |
| 2,888,740 | 6/1959 | Danis | 29/191.2 |
| 3,033,977 | 5/1962 | Quass et al. | 219/146 |
| 3,334,975 | 8/1967 | Quaas et al. | 29/191.6 |
| 3,345,495 | 10/1967 | Quass et al. | 219/146 |
| 3,559,864 | 2/1971 | Hillert | 427/59 X |
| 3,592,999 | 7/1971 | Quass | 219/146 |
| 3,783,234 | 1/1974 | Russell | 219/146 |
| 3,835,288 | 9/1974 | Henderson | 219/145 |

*Primary Examiner*—C.W. Lanham
*Assistant Examiner*—V. K. Rising
*Attorney, Agent, or Firm*—Jack Schuman; Joseph J. Phillips

[57] ABSTRACT

In the manufacture of filled tube rods the ends of the rods are sealed with a solid organic film volatilizable at welding temperature to provide a contaminant free weldment. The organic film is preferably a sealant composition containing pyroxylin (nitrocellulose), ether, and absolute alcohol as principal ingredients, and dried by very rapid means, i.e., infrared heating.

9 Claims, 1 Drawing Figure

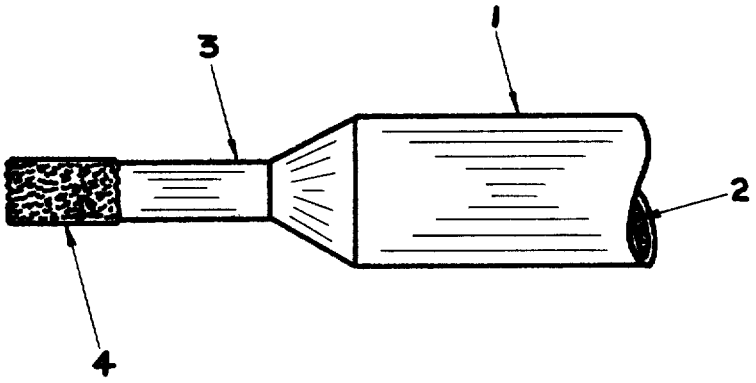
1
2
3
4

METHOD OF SEALING THE END OF A FILLED WELDING ROD

Matter enclosed in heavy brackets [ ] appears in the original patent but forms no part of this reissue specification; matter printed in italics indicates the additions made by reissue.

This invention relates to improved tube rods and methods of manufacturing the same and particularly to tube rods that are used in hard facing and, more particularly, to an improved method of producing tube rods.

Tube rods have been used in the hard facing art for over 40 years. U.S. Pat. No. 1,757,601, granted in May, 1930, discloses the principal characteristics of tube rods in general. The tube and sheath may be composed of any metal such as iron-base, nickel-base, cobalt-base, copper-base, and the like. For example, U.S. Pat. No. 3,091,022 discloses a typical cobalt-base tube rod. The filler material may contain hard particles of any ceramic and/or metallic composition that provides the wear resistance. The tube and sheath essentially provides the matrix and the filler material essentially provides the dispersoid within the matrix. U.S. Pat. No. 1,757,601 discloses that after the tube rods have been filled, the ends of the tube rods are preferably pinched together to confine the particles within the tube. The pinched ends provided a sufficient solution as long as the particles were relatively large enough to be so confined. However, such practice is not ideally operable when fillers of very fine particle size are required in the tubes. The filler particles tend to pass or sift through the pinched ends thereby upsetting the composition balance of the tube rod.

Several methods have been used to close the tube rod ends. An ideal, but costly, method is to weld the tip end. The welded tip, in some cases, may cause difficulty in starting the welding process because of the highly oxidized surface of the weldment. Another method suggests the use of a molten metal (for example, aluminum) as a sealant; however, this is objected to because of the undesirable metal contamination. Various compositions of paints to seal the pinched ends have been used as still another method; however, painting is limited because of possible contaminations resulting from the composition of the paint (aluminum oxide, lead oxide, sulfur, and other deleterious pigments and vehicles). Such contaminants frequently cause porosity in the final deposit, consequently this results in rejection of the hard-faced part.

It is a principal object of this invention to provide an improved means of sealing the ends of the tube rods.

It is another principal object of this invention to provide a new composition of matter for use as a means of sealing tube rods.

It is still another object of this invention to provide an easier and more economical method of manufacture of tube rods.

It is yet another object of this invention to provide a tube rod containing the improved sealant that leaves no harmful ash or residue in the final product.

Other aims and objectives of the invention will be apparent from the following description and appended claims.

*The drawing represents, diagrammatically, a view in side elevation of that portion of the body of a tube rod adjacent a reduced diameter end which has been sealed according to this invention.*

In accordance with the present invention a new composition of matter is provided for use as a sealant for tube rods.

In its broadest concept the preferred sealant composition of this invention contains, in volume percent (v/o):

| | |
|---|---|
| 2 - 20 | Pyroxylin (nitrocellulose) |
| 60 - 80 | Ether |
| 18 - 50 | Absolute alcohol |
| 0 - 10 | Camphor |
| 0 - 10 | Castor oil |

In the preferred range, the sealant composition of this invention contains, in volume percent:

| | |
|---|---|
| 4 - 8 | Pyroxylin |
| 60 - 80 | Ether |
| 18 - 25 | Absolute alcohol |
| Up to 5 | Camphor |
| Up to 6 | Castor oil |

As a nominal range, the sealant composition of this invention contains in volume percent:

| | |
|---|---|
| about 6.0 | Pyroxylin |
| about 67.0 | Ether |
| about 22.0 | Absolute alcohol |
| about 2.0 | Camphor |
| about 3.0 | Castor oil |

All ingredients may be of commercial or technical grade for suitable use economically.

The content of pyroxylin within the range 2 to 20 percent by volume provides the principal sealant in the composition. Ether and alcohol within the ranges 60 - 80 and 18 - 50 percent by volume, respectively, provide the principal solvent and drying characteristics of the composition. The composition may contain, optionally, camphor and castor oil each up to 10 percent by volume. Although the exact mechanism is not completely understood, it is believed that the camphor and castor oil promote improved plasticity to the sealant composition.

The manufacture of tube rods *1* that are filled with filler materials *2* and cut to appropriate lengths may be completed by any technique already used in the art. The ends *3* of the tube rods *1* are pinched, crimped or otherwise reduced in diameter by any means already used in the art. At this point, the tube ends *3* are dipped into the sealant composition *4* of this invention. It is only necessary to submerge the tube ends *3* up to an effective depth to permit the sealant composition *4* to seal. Spraying the tube ends with the sealant composition *4* is an alternative method of application.

Following the application of the sealant composition, the tube rod ends *3* may be dried by any suitable means, for example, hot air, radiant heat, gas or oil fired tunnels, and the like. It was discovered that an exposure to infrared heating was the most effective drying means. The use of infrared heating was found to provide the best combination of lower cost and more rapid processing than any other drying means. Furthermore, infrared requires the least amount of energy compared to other drying means.

EXAMPLE I

A portion of a production run of 5/32 inch diameter by 28 inches long filled iron-base rods *1* weighing 1,853 pounds was produced by means known in the art. The sealant *4* of this invention consisting essentially of 6 v/o pyroxylin, 67 v/o ether, 22 v/o absolute alcohol, 2 v/o camphor, and 3 v/o castor oil was poured into an open-end container to about three-eighths inch in depth. A small batch of about 130 rods *1* was dipped vertically into the sealant *4* and rotated about 360° clockwise and about 360° counter clockwise, for a total time of about 5 to 10 seconds, and removed from the sealant *4*. The tubes *1* were then inverted and the other end *1* was dipped into the sealant *4* in the same manner.

Following the latter dips, the tube rods *1* were placed on a 25 ft. long continuous chain conveyor for the drying step. One 150 w infrared heating lamp was positioned a few inches away from each end *3* of the tube rods *1* as the rods *1* were conveyed to an accumulating bin. The speed of the conveyor was essentially controlled by the time required to place (and space evenly) the rods *1* on the conveyor. It was found that a time of only a few seconds, not more than about 4 or 5 seconds exposure within the heat zone of the infrared lamp was required to effectively dry the tube rod ends *3* for subsequent handling.

Following the drying step, all of the tube rods *1* were found to be adequately dried. The tube rods *1* were tested by actual hard-facing depositions. There was no difficulty in starting the welding process. The hard-facing weldments did not contain any deleterious elements resulting from the sealant.

While certain preferred practices and embodiments of this invention have been described in the foregoing specification it will be understood that this invention may be otherwise embodied within the scope of the following claims.

We claim:

[1. The method of closing filled tube rod ends comprising the steps of reducing the diameter of the ends and sealing with a solid organic film volatilizable at welding temperature to provide a contaminant free weldment.]

[2. The method as claimed in claim 1 wherein the solid organic film comprises principally pyroxylin and alcohol.]

[3. The method of claim 1 wherein the sealing step is followed by drying said sealed ends by exposure to infrared heat.]

[4. The method of claim 1 wherein the sealant consists essentially of, in volume percent:

| | |
|---|---|
| 2 - 20 | Pyroxylin (nitrocellulose) |
| 60 - 80 | Ether |
| 18 - 50 | Absolute alcohol |
| 0 - 10 | Camphor |
| 0 - 10 | Castor oil. |

[5. The method of claim 1 wherein the sealant consists essentially of, in volume percent:]

| | |
|---|---|
| 4 - 8 | Pyroxylin |
| 60 - 80 | Ether |
| 18 - 25 | Absolute alcohol |
| Up to 5 | Camphor |
| Up to 6 | Castor oil. |

[6. The method of claim 1 wherein the sealant consists essentially of, in volume percent:]

| | |
|---|---|
| about 6.0 | Pyroxylin |
| about 67.0 | Ether |
| about 22.0 | Absolute alcohol |
| about 2.0 | Camphor |
| about 3.0 | Castor oil. |

[7. The method of closing tube rod ends comprising the steps of reducing the diameter of the ends, sealing said ends with a sealant consisting essentially of, in volume percent:]

| | |
|---|---|
| 2 - 20 | Pyroxylin (nitrocellulose) |
| 60 - 80 | Ether |
| 18 - 50 | Absolute alcohol |
| 0 - 10 | Camphor |
| 0 - 10 | Castor oil |

drying said sealant by means of infrared heat.]

[8. A filled tube rod made by the method of claim 1.]

*9. The method of closing an end of a filled tube welding rod comprising the steps of:*

*a. reducing the transverse cross-sectional area of the end of the filled tube welding rod, and*

*b. subsequently, applying to said reduced end to seal the said reduced end a solid organic film volatilizable at welding temperature to provide a contaminant-free weldment, said organic film comprising pyroxylin and alcohol.*

*10. The method of claim 9 wherein the sealant consists essentially of, in volume percent:*

| | |
|---|---|
| *2 - 20* | *Pyroxylin (nitrocellulose)* |
| *60 - 80* | *Ether* |
| *18 - 50* | *Absolute alcohol* |
| *0 - 10* | *Camphor* |
| *0 - 10* | *Castor oil* |

*11. The method of claim 9 wherein the sealant consists essentially of, in volume percent:*

| | |
|---|---|
| *4 - 8* | *Pyroxylin* |
| *60 - 80* | *Ether* |
| *18 - 25* | *Absolute alcohol* |
| *Up to 5* | *Camphor* |
| *Up to 6* | *Castor oil* |

*12. The method of claim 9 wherein the sealant consists essentially of, in volume percent:*

| | |
|---|---|
| *about 6.0* | *Pyroxylin* |
| *about 67.0* | *Ether* |
| *about 22.0* | *Absolute alcohol* |
| *about 2.0* | *Camphor* |
| *about 3.0* | *Castor oil* |

*13. A filled tube rod made by the method of claim 9.*

*14. The method of closing an end of a filled tube welding rod comprising the steps of:*

*a. reducing the transverse cross-sectional area of the end of the filled tube welding rod, then*

*b. sealing said reduced end with a sealant consisting essentially of, in volume percent:*

| | |
|---|---|
| 2 - 20 | Pyroxylin (nitrocellulose) |
| 60 - 80 | Ether |
| 18 - 50 | Absolute alcohol |
| 0 - 10 | Camphor |
| 0 - 10 | Castor oil |

*and then*

*c. drying said sealant by means of infrared head.*

*15. Method of closing the end of a filled tube welding rod, comprising:*

*a. reducing the transverse cross-sectional area of the end of the rod;*

*b. and subsequently sealing the reduced end of the rod with solid organic material volatilizable at welding temperature, by contacting the reduced end of the rod with a solution comprising pyroxylin and alcohol.*

*16. A filled tube welding rod made by the method of claim 15.*

*17. Method of closing the end of a filled tube welding rod, comprising:*

*a. reducing the transverse cross-sectional area of the end of the rod;*

*b. and subsequently sealing the reduced end of the rod with solid organic material volatilizable at welding temperature, by contacting the reduced end of the rod with a solution comprising pyroxylin and alcohol and thereafter exposing the said reduced end of the rod to infrared heat to dry the reduced end of the rod.*

* * * * *